ered with the patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

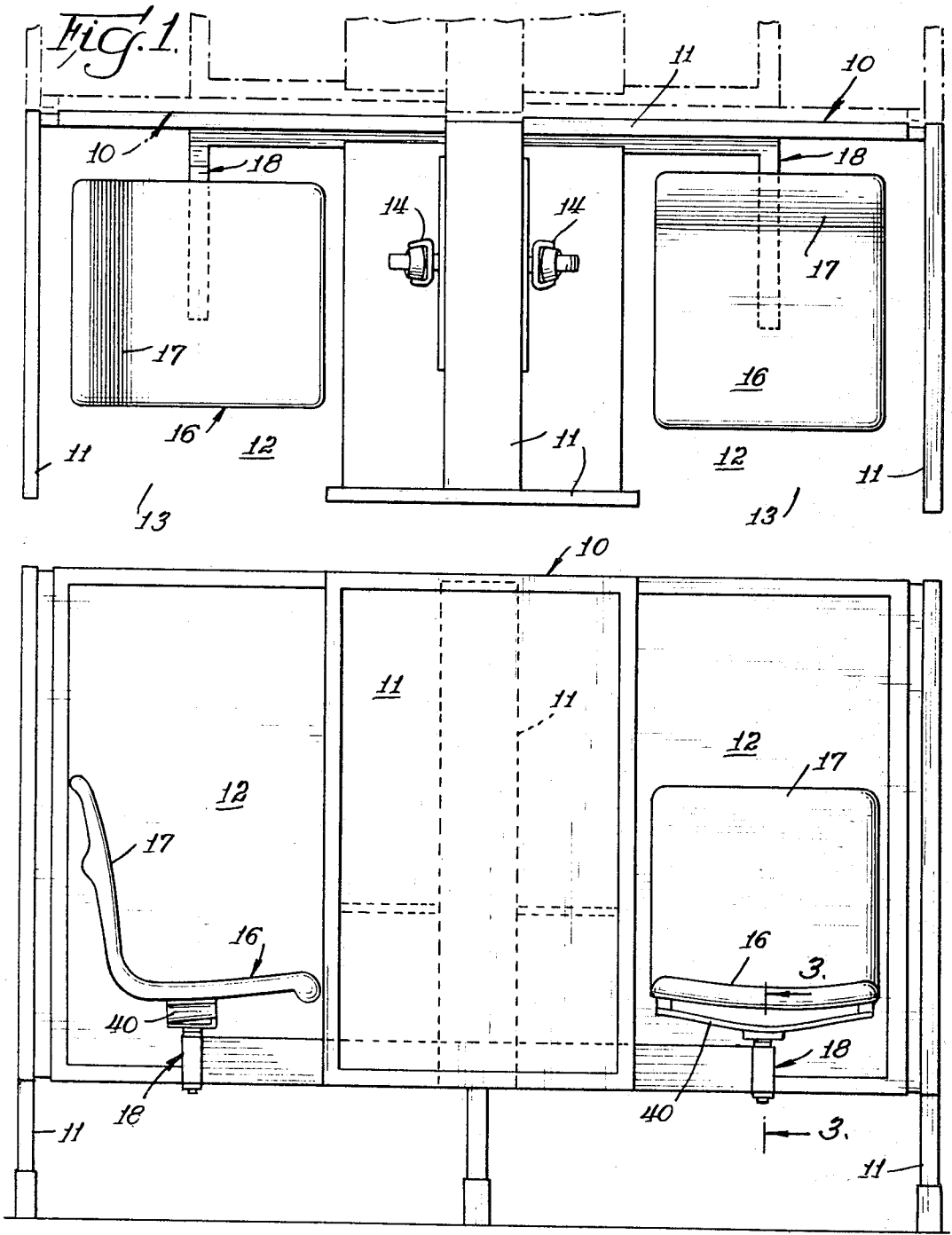

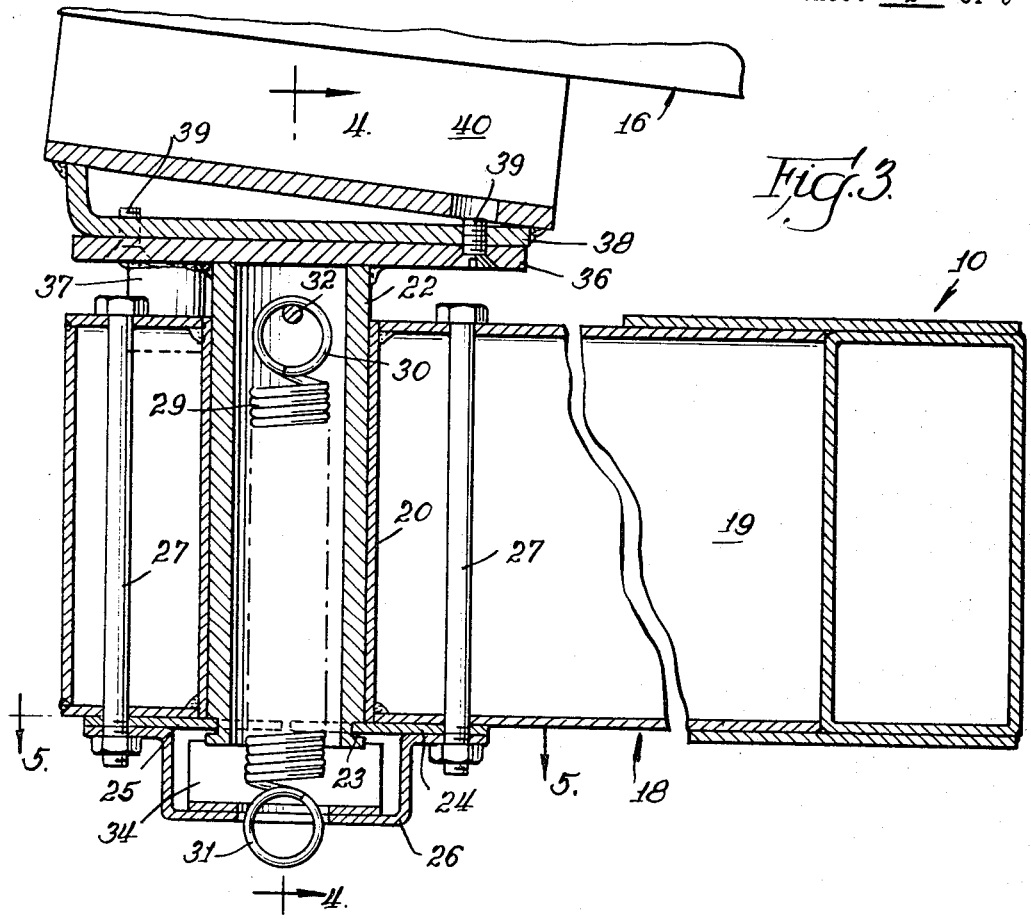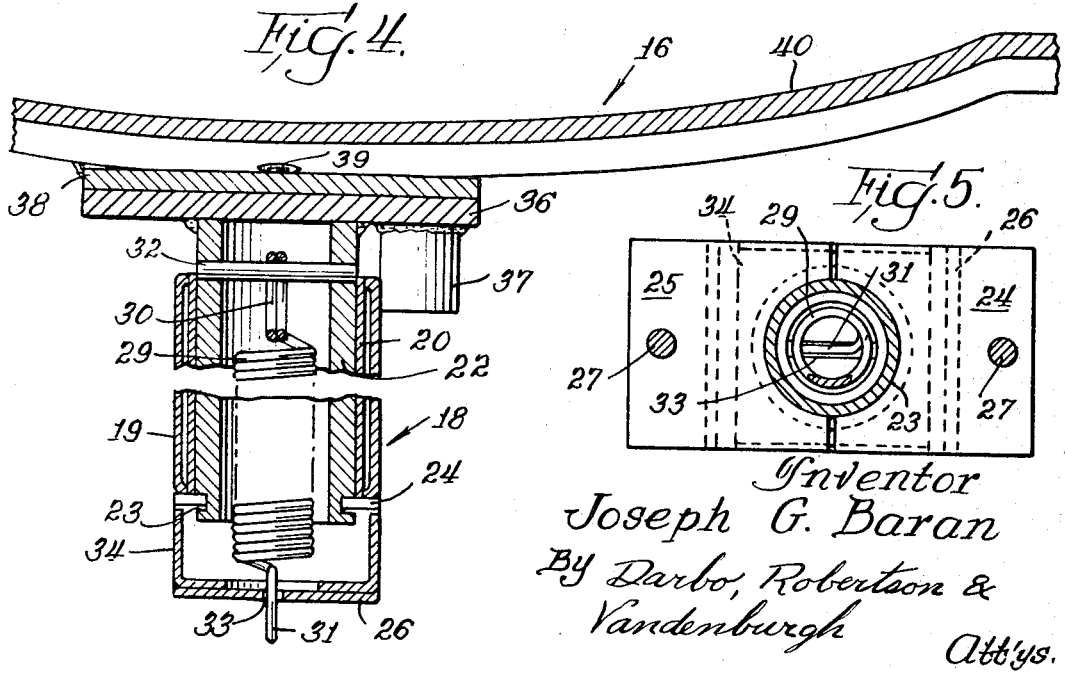

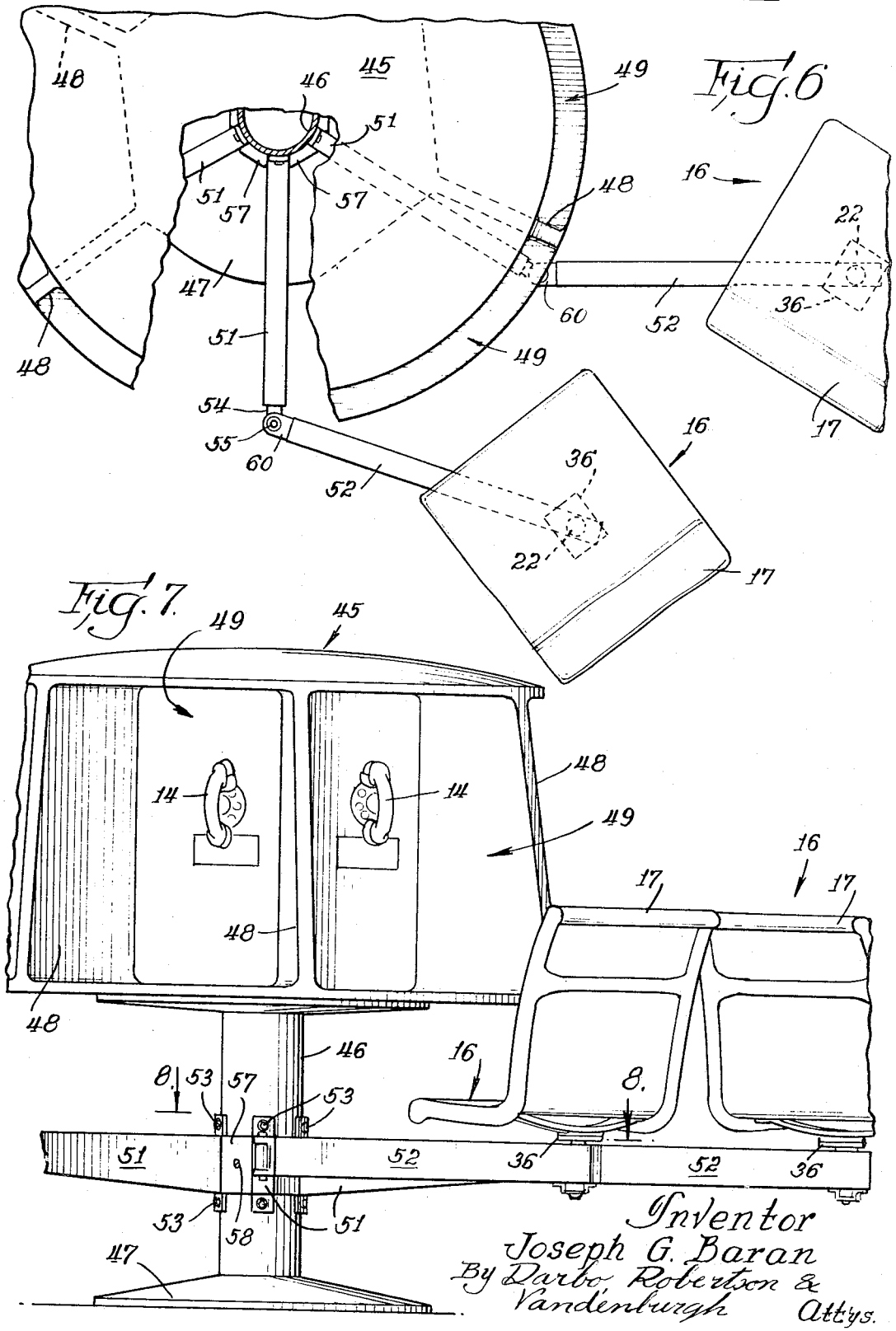

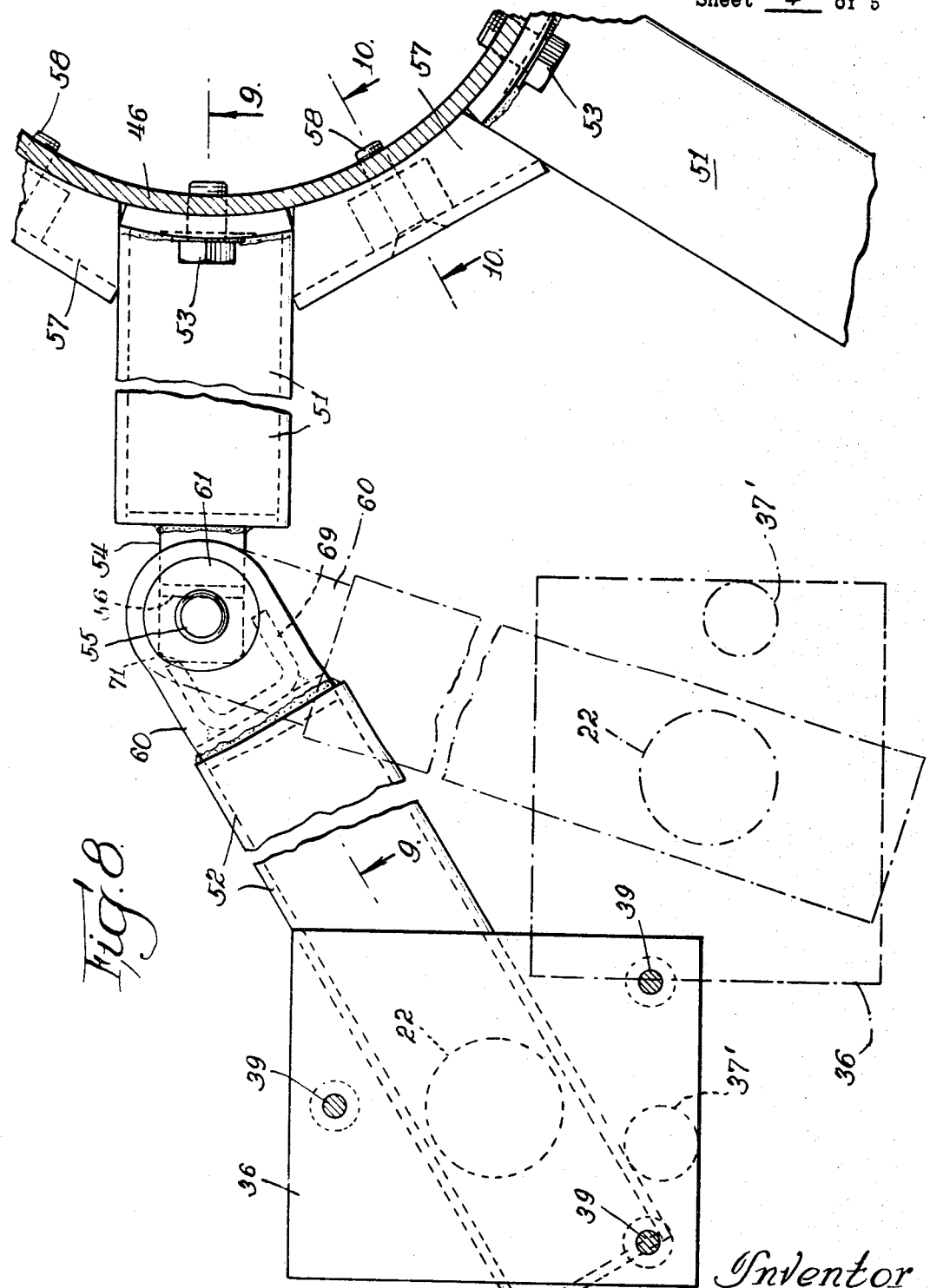

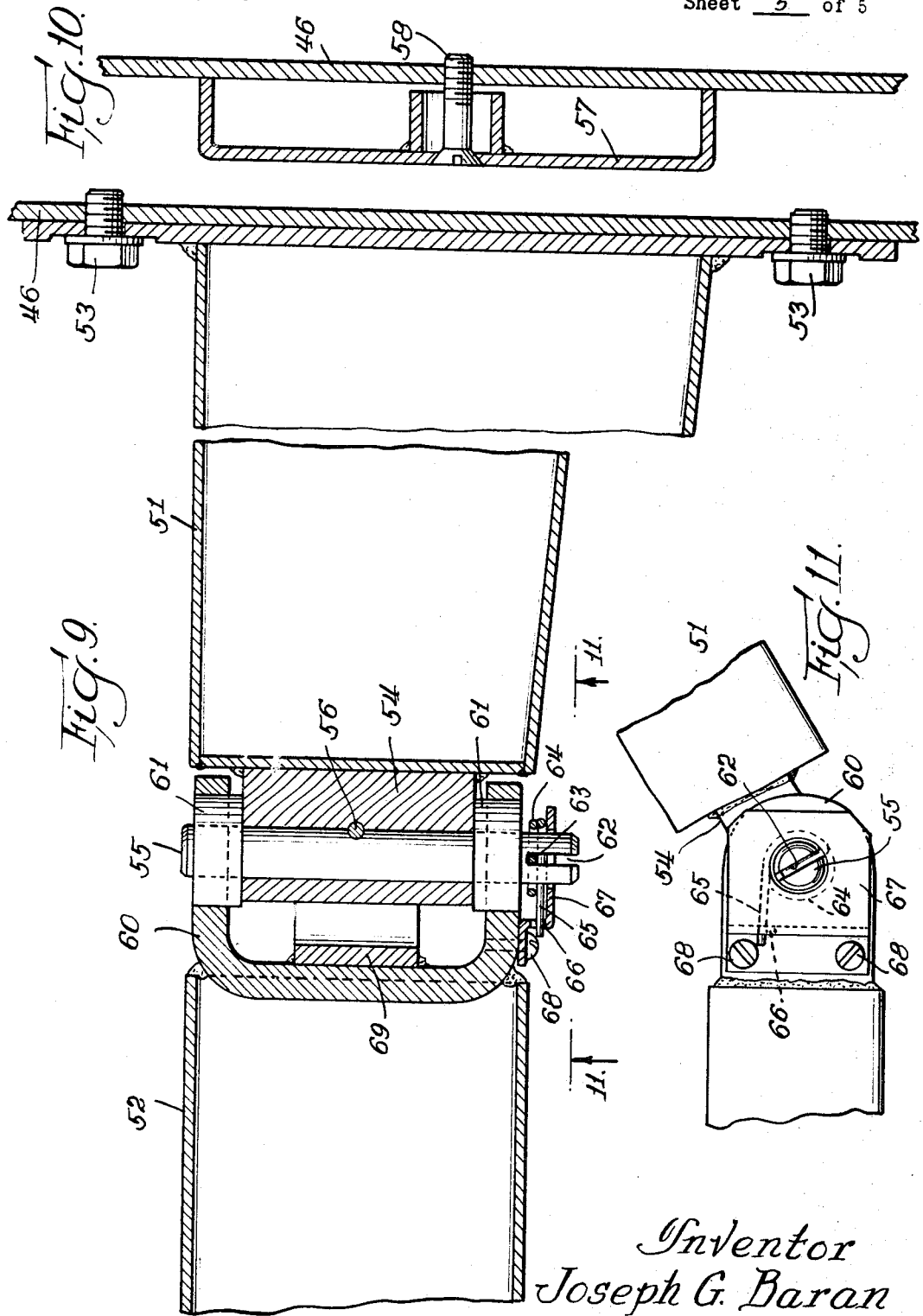

United States Patent Office 3,419,305
Patented Dec. 31, 1968

3,419,305
BOOTH WITH CANTILEVER-MOUNTED SPRING-BACK SEAT
Joseph G. Baran, Northbrook, Ill., assignor, by mesne assignments, to Acoustics Development Corporation, Northbrook, Ill., a corporation of Illinois
Filed Jan. 25, 1967, Ser. No. 611,602
9 Claims. (Cl. 297—157)

ABSTRACT OF THE DISCLOSURE

A telephone booth is provided with one or more cantilever-supported seats. Each seat has a back and is pivotally mounted with springs and stops to normally position the seat for easy entry and permit rotation of the occupied seat to a position for use of the telephone.

Background of the invention

Telephone booths, being preferably located in areas of relatively intensive use by people for convenient use, occupy valuable space. For this reason, the booths are designed to minimize space requirements with the result that it is frequently difficult for a person to get into and leave the seat. Accordingly, a design which provides a seat in readily accessible position with provision for such adjustment of position as may be required for the comfort of the person while using the telephone is highly desirable.

A major problem in the maintenance of telephone booths is that of keeping the floor clean. Cantilever-mounted seats minimize obstructions that would otherwise interfere with sweeping or other floor cleaning operations.

Summary of the invention

The inventive concept features a highly advantageous seating arrangement for telephone booths. Each seat is provided with a back for the comfort of the user and to assist in adjustment of the position of the seat; each seat is mounted cantilever fashion from the main support for the booth, and each seat is pivotally mounted with a spring and stop arrangement for normally positioning the seat for easy access to the user and permitting rotation of the seat, when occupied, to a position which is comfortable during use of the telephone. To leave the seat, the person may turn in it to approximately the normal unoccupied position of the seat for unlabored departure.

Brief description of the drawings

FIGURE 1 is a plan view of one embodiment having a plurality of enclosed phone booths with a door opening for each booth for ingress and egress;

FIGURE 2 is an elevational view of the embodiment of FIGURE 1;

FIGURE 3 is an enlarged partial section as viewed at line 3—3 of FIGURE 2;

FIGURE 4 is a section as viewed at line 4—4 of FIGURE 3;

FIGURE 5 is a section as viewed at line 5—5 of FIGURE 3;

FIGURE 6 is a plan view, partially broken away, of an alternative embodiment having a plurality of telephone cubicles positioned about a central pedestal;

FIGURE 7 is an elevational view of the embodiment of FIGURE 6;

FIGURE 8 is an enlarged partial section as viewed at line 8—8 of FIGURE 7;

FIGURE 9 is a partial section as viewed at line 9—9 of FIGURE 8;

FIGURE 10 is a partial section as viewed at line 10—10 of FIGURE 8; and

FIGURE 11 is a bottom view as seen along line 11—11 of FIGURE 9.

Description of preferred embodiments

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Referring particularly to FIGURES 1 and 2, there is a frame means, generally 10, which includes walls 11 defining phone booth spaces 12. An access opening 13 is provided for each of spaces 12. In this embodiment the phone booths are formed in pairs, although as illustrated at dotted lines at the top of FIGURE 1, two of such pairs may be used together, or one pair may be used alone as, for example, against a wall. In each booth is a telephone 14.

In each booth is a comfortable seat, generally 16, having a back 17. At the right side of FIGURES 1 and 2 the seat 16 is illustrated in the normal, unoccupied, position. The seats at the left side of FIGURES 1 and 2 have been rotated away from the normal position, such as would be done by a user after being seated therein and desirous of operating the telephone 14.

Each seat is mounted upon a support means, generally 18. In the embodiment illustrated in FIGURES 1–5 the support means includes an arm 19 of tubular configuration having its proximal end fixedly secured to frame 10. Adjacent the distal end of arm 19 there is a sleeve 20 positioned vertically and secured to the arm. Seat 16 has a hollow spindle 22 which is journaled in sleeve 20. Adjacent the lower end of spindle 22 is an annular groove 23. A split bearing plate comprising portions 24 and 25 extends into groove 23 to hold spindle 22 against vertical movement. This bearing plate along with spring retainer 26 are releasably affixed to arm 19 by means of bolts 27.

Within hollow spindle 22 is a coiled helical spring 29 having a double loop 30 at its upper end and a single loop 31 at its lower end. A pin 32 extends through loop 30 and is press fitted into openings in the walls of spindle 22. Loop 31 extends through a slot 33 in spring retainer 26 and is thereby held against any significant rotation with respect to support 18. To enclose the lower end of the spring a U-shaped bracket 34 is affixed to spring retainer 26.

At the upper end of spindle 22, seat 16 has a mounting plate 36. Extending downwardly from mounting plate 36 is one part 37 of a stop, the other part of the stop being formed by the side wall of arm 19, as best seen in FIGURE 4. A positioning plate 38 is secured to mounting plate 36 by means of screws 39. Welded to positioning plate 38 is an antler 40 which extends across the width of seat 16 to serve as a bearing member. Positioning plate 38 inclines antler 40 so that the rear portion of the seat will be downwardly with respect to the front portion of the seat.

Spring 29 resiliently urges seat 16 to the position at which stop portion 37 contacts the side of arm 19. This is the position of the seat illustrated at the right hand side of FIGURES 1 and 2. The seat is rotatable in the opposite direction away from this position so that after being seated in the booth the user can then rotate the seat so that back 17 is facing telephone 14, as illustrated at the left hand side of FIGURES 1 and 2. If the user would lift his feet, or rise from the seat, spring 29 would return the seat to the normal position. It should be emphasized, however, that this urging by spring 29 is relatively light so as not to cause the user to be uncomfortable in attempting to retain the seat in the position at which the telephone is readily accessible for use. The tension on spring 29 may be adjusted by removing spring retainer 26 and rotating the lower loop 31 one way or the other before reinserting loop 31 in slot 33 and affixing spring retainer 26 to the arm. Because of the construction, assembly and disassembly of the seat mounting is relatively simple.

FIGURES 6–11 illustrate an embodiment wherein there is a frame, generally 45, including a central pedestal 46 affixed to a base 47. Normally base 47 will be secured to the floor as by any suitable means. Frame 45 includes a plurality of radial walls 48 dividing the space about the frame into a plurality of spaces or cubicles 49 each having a telephone 14 therein.

In this embodiment the cantilever support means for each of seat 16 comprises a pair of pivotally connected arms 51 and 52. The proximal end of each arm 51 is rigidly affixed to pedestal 46, as by means of bolts 53. The distal end of arm 51 has a bearing block 54 in which is received a pivot pin 55. A transverse pin 56 holds pivot pin 55 in place. Spacers 57 are wedged between adjacent arms 51 and held in place by bolts 58. This serves to add rigidity to the mounting of arms 51.

On the proximal end of outer arm 52 is a U-shaped bracket 60 holding bearings 61 journaled on pin 55. The bottom end of pin 55 has a slot 62 to receive end 63 of coil spring 64. The other end 65 of spring 64 is received in an opening 66 of a spring retainer 67. Spring retainer 67 is held in place on arm 52 by means of bolts 68. A U-shaped stop bracket 69 is welded to bracket 60.

The arrangement is such that spring 64 will urge outer arm 52 in a clockwise direction (as viewed in FIGURE 8) until stop 69 contacts abutment or stop 71 on bearing block 54. However, against the urging of spring 64 outer arm 52 may be rotated until the opposite end of stop 69 contacts the side of bearing block 54. This limit of movement is illustrated in dotted lines in FIGURE 8.

The mounting of seat 16 on the distal end of outer arm 52 corresponds to that illustrated and described in connection with FIGURES 3–5. The only difference is that stop 37' of seat 16 is positioned so that seat 16 normally will assume the position illustrated at the upper right corner of FIGURE 6. When a person has seated himself on seat 16 he can then rotate the seat so that the back 17 is facing the telephone, as illustrated at the bottom right side of FIGURE 6, and in the foreground of FIGURE 7. The person so seated also may move up to the telephone 14 by a counterclockwise rotation of outer arm 52 with respect to inner arm 51.

I claim:

1. In a telephone booth apparatus having a frame with a telephone mounted thereon, the improvement comprising: support means having a proximal end affixed to said frame and a distal end positioned in front of said telephone and at a level between the telephone and the floor, said support means including an arm having bearing means at the distal end; a seat rotatably mounted at the distal end of said arm, said seat having an upstanding back, said seat including a hollow vertical spindle extending downwardly therefrom and into said bearing means to be supported thereby, said spindle having an annular groove below said arm; positioning means operably connecting said support means and said seat to normally orient said seat with the back at an angle to said telephone to facilitate a user's occupancy of said seat while permitting the user to rotate said seat to a position at which the back is facing said telephone to facilitate the user's use of the telephone, said positioning means including a spring rotationally urging said seat from said use position in a direction toward said normal position, and a stop to prevent rotation of the seat in said direction beyond said normal position, said spring being positioned in said hollow spindle, extending vertically therein and being connected at its upper end to the spindle, the lower end of the spring being operably connected to said support means to prevent significant rotation of the lower end with respect to the support means; and a split bearing plate releasably attached to said arm and extending into said groove to restrain the spindle against vertical movement.

2. In an apparatus as set forth in claim 1, wherein said stop is affixed to said seat and extends downwardly at a side of said arm, said spring is a helically wound spring having a ring at the top and a ring at the bottom, said seat includes a pin extending through the spindle and upper ring, said support means includes a spring retainer having a slot through which said bottom ring extends and which holds the bottom ring against significant rotation, said bearing plate being between said retainer and said arm, and bolts affixing said retainer and bearing plate to said arm.

3. In an apparatus as set forth in claim 1, and of the type defining an enclosed space with a doorway, said support means comprising a fixed arm with the distal end being approximately centered with respect to said doorway, said seat in said normal position having said back facing said doorway.

4. In an apparatus as set forth in claim 3, wherein said stop is affixed to said seat and extends downwardly at a side of said arm, said spring is a helically wound spring having a ring at the top and a ring at the bottom, said seat includes a pin extending through the spindle and upper ring, said support means includes a spring retainer having a slot through which said bottom ring extends and which holds the bottom ring against significant rotation, said bearing plate being between said retainer and said arm, and bolts affixing said retainer and bearing plate to said arm.

5. In an apparatus as set forth in claim 1, wherein said frame comprises a central pedestal with the telephone at one side thereof and includes means defining a limited space in front of said telephone, said support means includes a first arm and a second arm pivotally secured to the first arm for movement in a horizontal plane, the proximal end of the first arm being affixed to the pedestal, said seat being on the distal end of the second arm.

6. In an apparatus as set forth in claim 5, wherein said stop is affixed to said seat and extends downwardly at a side of said arm, said spring is a helically wound spring having a ring at the top and a ring at the bottom, said seat includes a pin extending through the spindle and upper ring, said support means includes a spring retainer having a slot through which said bottom ring extends and which holds the bottom ring against significant rotation, said bearing plate being between said retainer and said arm, and bolts affixing said retainer and bearing plate to said arm.

7. A telephone booth apparatus comprising: a pedestal having a base and a top; booth means mounted on the top of said pedestal, approximately circular about a vertical axis, and defining a plurality of segmented telephone cubicles overhanging the top of said pedestal, each cubicle having two radially positioned side walls and an open front; a plurality of fixed arm means, each of said cubicles having an arm means radially positioned adjacent the radial positioning of one of the side walls of the cubicle, each arm means being approximately midway between the base and the top of the pedestal and having a proximal end fixedly attached to the pedestal and a distal end below approximately the periphery of said booth means; a plurality of pivotal arms, one for each of said cubicles and having a first end of the pivotal arm pivotally connected to the distal end of fixed arm means for movement about a vertical axis, said pivotal arm being moveable from a first position at which its distal end is outwardly spaced from the respective cubicle with an obtuse included angle between the connected fixed arm means and the pivotal arm and a second position at which said distal end of the pivotal arm is approximately centered in front of the respective cubicle; means on the fixed arm means and pivotal arms to urge said pivotal arm towards the first position and to prevent movement of the pivotal arm beyond said first position; a plurality of seat means, each pivotally mounted on the distal end of a respective pivotal arm, each seat means having a front and a back, each seat means being moveable between a first position at which the seat means is facing toward the booth means and a second position at which said front thereof is at least as far away from the booth means as is the back of the seat means; and positioning means connecting each seat means and the respective pivotal arm to resiliently urge said seat means towards said second position thereof and to prevent movement of the seat means beyond said second position thereof.

8. An apparatus as set forth in claim 7, wherein each seat means includes a hollow vertical spindle extending downwardly therefrom, said spindle having an annular groove adjacent the lower end thereof, said pivotal arms having bearing means at the distal end thereof receiving and rotatably supporting said spindle, said positioning means including a spring in said hollow spindle, extending vertically therein and being connected at its upper end to the spindle and at its lower end to the pivotal arm, and a split bearing plate releasably attached to the pivotal arm and extending into said groove to restrain the spindle against vertical movement.

9. An apparatus as set forth in claim 8, wherein said spring is a helically wound spring having a ring at the top and a ring at the bottom, each seat means including a pin extending through the spindle and the upper ring, a spring retainer having a slot through which said bottom ring extends and which holds the bottom ring against significant rotation, said bearing plate being between said retainer and the respective pivotal arm, and bolts affixing said retainer and bearing plate to said pivotal arm.

References Cited

UNITED STATES PATENTS

| | | | |
|---|---|---|---|
| 1,522,830 | 1/1925 | Nichols et al. | 248—145 |
| 1,532,354 | 4/1925 | Walton | 248—417 |
| 1,829,564 | 10/1931 | Lederer | 297—349 |
| 1,753,506 | 4/1930 | Florine | 248—145 |
| 2,896,694 | 7/1959 | Sherron | 297—217 |
| 2,970,874 | 2/1961 | Honeycutt et al. | 108—60 X |
| 3,076,677 | 2/1963 | Kelso | 297—349 |
| 3,186,761 | 6/1965 | Propst | 297—349 |
| 3,212,816 | 10/1965 | Nordmark | 297—170 |
| 3,226,154 | 12/1965 | Allen | 297—157 |

FRANCIS K. ZUGEL, *Primary Examiner.*

U.S. Cl. X.R.

248—417; 297—217, 349